United States Patent [19]

Young et al.

[11] 4,262,759
[45] Apr. 21, 1981

[54] COMBINATION SEAL AND PRESSURE RELIEF VALVE FOR SEALED DRILL STRING UNIT

[75] Inventors: James W. Young, Irving; Ricky K. Schpok, Dallas, both of Tex.

[73] Assignee: Dresser Industries, Inc., Dallas, Tex.

[21] Appl. No.: 78,366

[22] Filed: Sep. 24, 1979

[51] Int. Cl.$^3$ .............................................. E21B 10/24
[52] U.S. Cl. .................................. 175/227; 175/345; 175/371; 277/26; 277/205
[58] Field of Search .............................. 175/345–347, 175/371, 372, 334, 227–229; 308/8.2; 277/205, 26

[56] References Cited
U.S. PATENT DOCUMENTS

| | | | |
|---|---|---|---|
| 3,384,382 | 5/1968 | Rink | 277/205 |
| 3,389,760 | 6/1968 | Morris | 175/371 |
| 3,469,854 | 9/1969 | Linwood | 277/205 |
| 3,653,672 | 4/1972 | Felt | 277/205 |
| 3,719,241 | 3/1973 | Bell | 175/228 |
| 3,862,762 | 1/1975 | Millsap | 308/8.2 |
| 3,977,481 | 8/1976 | Fisk et al. | 175/228 |

*Primary Examiner*—William F. Pate, III

*Attorney, Agent, or Firm*—Fred A. Winans; Eddie E. Scott

[57] ABSTRACT

A drill string reamer-stabilizer includes a main body adapted to be connected as an element of a rotary drill string. Individual bearing shafts are mounted axially along the exterior of the main body supporting roller cutters that engage the wall of the borehole. Seal units are positioned around each bearing shaft between each roller cutter and bearing shaft to define a lubricant space. The seal units retain lubricant in the lubricant space and prevent contaminating fluid and materials in the borehole from entering the lubricant space. At least one seal unit comprises an annular cup-shaped elastomer seal member with an annular lip mounted in an annular seal gland in the roller cutter. The seal gland has an inner side adjacent the lubricant space and an outer side exposed to the fluid and materials in the borehole. A ring of compressible filler material fits in the cavity of the cup-shaped elastomer seal member and allows the elastomer seal member to deform so that internal pressure in the lubricant space is vented outward past the annular lip of the seal member but allows external pressure of fluid and materials in the borehole to force the seal member against the inner side of the seal gland creating a fluid tight seal.

4 Claims, 4 Drawing Figures

COMBINATION SEAL AND PRESSURE RELIEF VALVE FOR SEALED DRILL STRING UNIT

BACKGROUND OF THE INVENTION

The present invention relates to the art of earth boring and, more particularly, to a drill string unit adapted to be connected as a member of a rotary drill string. A drill string unit generally comprises a body threaded at at least one end for incorporation in a rotary drill string. This body supports a multiplicity of bearing shafts. A rotary cutter is rotatably mounted upon each bearing shaft. The drill string unit must operate under very severe earth boring conditions, and the size and geometry of the drill string unit is restricted by the operating characteristics. The economics of petroleum production and earth boring demand a longer lifetime and improved performance from the drill string unit. Attempts to increase the lifetime and improve the performance of the drill string unit have included sealing and lubricating the rotary cutters. The sealing and lubricating systems have encountered problems created by the environmental conditions encountered in earth boring.

A wide variety of environmental conditions affect the performance of the drill string unit. For example, the temperature will rise as the borehole penetrates deeper into the earth and temperatures of up to 325° F. are presently being encountered. Deep wells now being drilled are expected to result in environmental temperatures of up to 400° F. and the drilling of steam wells results in environmental temperatures as high as 550° F. The elevated temperatures have an adverse effect on the lubricant, the structural elements of the lubrication system, the structural elements of the seal members and a substantial increase in the pressure of the lubricant within the lubrication system may be encountered.

DESCRIPTION OF PRIOR ART

In U.S. Pat. No. 3,413,045 to William Isaac Wohefeld, patented Nov. 26, 1968, a sealed lubricated reamer-stabilizer is shown. The abstract of the disclosure provides the following description. Metal roller of large hole reamer-stabilizer is rotatably mounted on hollow spindle carried by body of reamer-stabilizer. Tapered roller bearings mount roller on spindle. Hollow spindle provides grease reservoir communicating through radial ports in spindle and thence through annulus between roller and spindle with the bearings adjacent ends of roller and spindle. Floating, face-type, pressure seals between each end of roller and spindle beyond bearings prevent entrance of drilling fluid into bearings and loss of grease from bearings. Entrance of grease into reservoir is provided through check valve type grease gun collector in plug closing one end of hollow spindle. Other end of hollow spindle is closed by a plug having a port therethrough. The port is closed by an elastic, e.g., fabric reinforced elastomer tube extending into hollow spindle, the end of the tube remote from the port being closed. Grease pumped into reservoir through check valve collapses tube and fills hollow spindle with grease which is maintained under pressure by elasticity of tube. As grease is lost in use of apparatus, tube expands, moving grease from reservoir in spindle to the bearings. When apparatus is subjected to pressure of drilling fluid deep in an earth bore, volume reduction of grease due to increased pressure is compensated by expansion of tube and flow of grease from spindle to bearings, thereby preventing movement of external fluid past seals into bearings. Pressure across seals never exceeds initial pressure when reservoir filled since external fluid pressure on seal is balanced by internal fluid pressure of grease which in turn is subjected to external fluid pressure acting on tube.

In U.S. Pat. No. 4,013,325 to I. G. Rear, patented Mar. 22, 1977, a stabilizing tool is shown. The abstract describes the stabilizing tool as comprising a substantially cylindrical body; said body having a plurality of substantially cylindrical chambers formed therein, said chambers being located axially within the body and spaced symmetrically around the body with respect to the longitudinal central axis thereof, wherein the diameter of the chambers is such that a portion of the wall would extend beyond the perimeter of the body to provide axial rectangular openings in the side of the body; each end of the body being provided with an axial fluid passageway which is divided to provide a fluid path through each chamber; stabilizing rollers rotatably mounted upon a hollow shaft mounted in said chambers such that the circumference of rotation of the rollers extend through said rectangular openings beyond the body; a lubricant reservoir provided in said body and vented to the fluid passageway for the application of fluid pressure to the lubricant in the reservoir; and outlets in the reservoir communicating with the bearing surfaces between the rollers and shafts.

SUMMARY OF THE INVENTION

The present invention provides a rotary drill string unit adapted to be connected as an element of a rotary drill string. The drill string unit includes a main body with at least one bearing shaft mounted on the main body. A roller member is rotatably mounted on the bearing shaft. Seal means are positioned around said bearing shaft between the roller member and the bearing shaft thereby defining a lubricant space. The seal means improves operation of the drill string unit in the drilling environment. The seal means retains lubricant in the lubricant space and prevents contaminating materials in the borehole from entering the lubricant space. The seal means includes an annular cup-shaped elastomer seal member located in a seal gland. A compressible annular ring-like member is located in the cavity of the cup-shaped elastomer seal member. The elastomer seal member includes an annular lip member that is normally in contact with the bearing shaft. High internal pressure in the lubricant space forces the lip away from the bearing shaft and causes the compressible ring-like member to be compressed. This allows internal pressure of lubricant within the lubricant space to be vented past the elastomer seal member. The pressure of fluid in the drilling environment will act on the elastomer seal member forcing it against the inner side of the seal gland and forming a fluid tight seal. The above and other objects and advantages of the present invention will become apparent from a consideration of the following detailed description of the invention when taken in conjunction with the accompanying drawings.

DETAILED DESCRIPTION OF THE INVENTION

Figure 1:
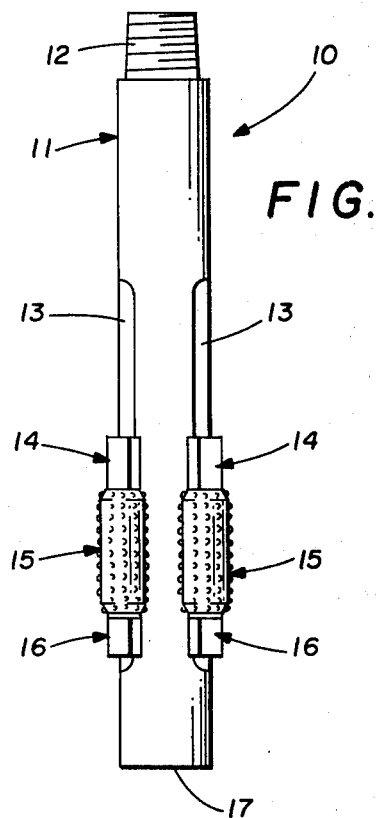
FIG. 1 illustrates a drill string unit embodying the present invention.

Referring now to FIG. 1, a drill string unit is illustrated generally at 10. The drill string unit shown is a reamer-stabilizer adapted to be connected as an element of a rotary drill string. The upper portion of the reamer-stabilizer is threaded with threads 12 in order that the reamer-stabilizer may be connected to the element of the drill string immediately above. The lower portion of the reamer-stabilizer includes internal threads 17 that connect the reamer-stabilizer to the drill string element immediately below. Drilling fluid enters a central passageway in the reamer-stabilizer 10 and is transported through the reamer-stabilizer 10. Three roller cutters are positioned on the reamer-stabilizer body 11. The roller cutters are rotatably mounted on three individual shafts. Two of the roller cutters 15 are shown in FIG. 1. The bearing shaft that supports the roller cutters 15 are locked to the body 11 of the reamer-stabilizer 10 by blocks 14 and 16. The blocks 14 and 16 fit within recesses 13 in the body 11.

Figure 2:
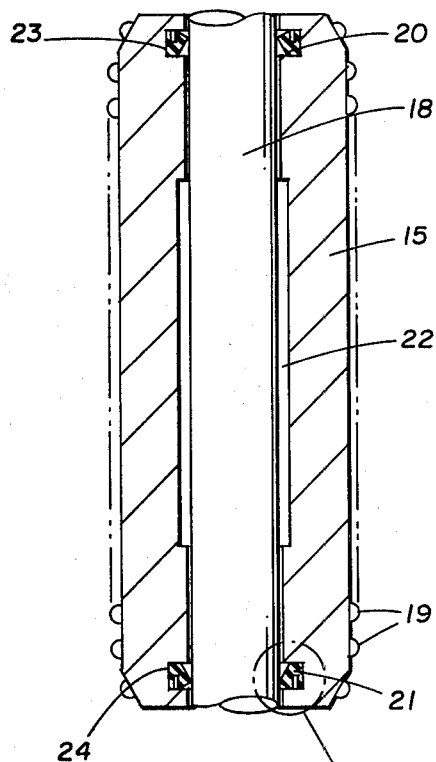
FIG. 2 is an enlarged cutaway view of a portion of the drill string unit shown in FIG. 1.

Referring now to FIG. 2, an enlarged view of one of the roller cutters 15 is shown. The bearing shaft 18 is positioned on the body of reamer-stabilizer 10 and the roller cutter 15 is mounted on the bearing shaft 18. The roller cutter 15 includes a multiplicity of inserts 19. Seals 20 and 21 define a lubricated area 22 along a substantial portion of the length of the internal surface of the roller cutter 15 and external surface of bearing shaft 18. The upper seal 20 is positioned around the bearing shaft 18 between the roller cutter 15 and bearing shaft 18. The seal 20 fits within an annular groove 23 in the cutter 15. The lower seal 21 is positioned around the bearing shaft 18. The lower seal 21 fits within a groove 24 in the roller cutter 15. The two seals 20 and 21 define the lubricated area 22 along a substantial portion of the length of the internal surface of the roller cutter 15 and external surface of bearing pin 18. Lubricant fills the lubricated area 22.

Figure 3:
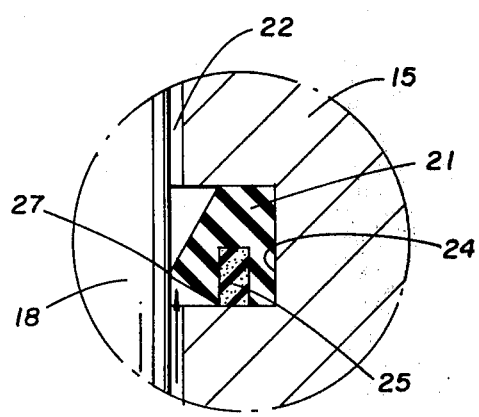
FIGS. 3 and 4 are enlarged views of the seal of the drill string unit shown in FIG. 2.
Figure 4:
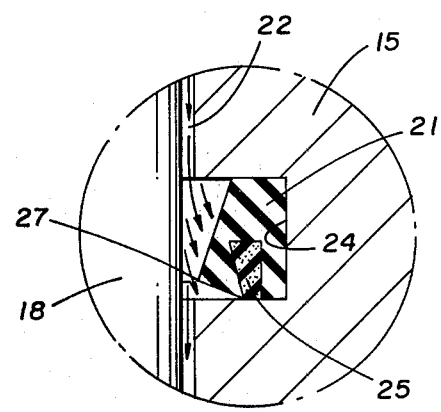

Referring now to FIGS. 3 and 4, an enlarged view of the lower seal 21 is shown. The seal 21 retains lubricant in the lubricant space 22 and prevents contaminating materials in the borehole from entering the lubricant space 22. The seal 21 comprises an annular elastomer seal member 21. A filler 25 is inserted in a cavity 26 in the seal member 21. The seal member will deform radially and allow excessive pressure of lubricant in the lubricant space to be relieved outward as illustrated in FIG. 3. Fluid in the borehole is prevented from entering the lubricant space 22 as shown by FIG. 4.

The elastomer seal member 21 includes a lip or wedge surface 27. The pressure of fluid outside the drill string unit 10 will tend to force the wedge surface 27 toward the bearing pin 18. Internal pressure of lubricant within the lubricated area 22 will tend to force the wedge surface 27 of elastomer seal member 21 radially outward allowing escape of volume within the lubricant space 22 and the relief of internal pressures. The filler material 25 compresses or deforms to allow the lip 27 to move radially outward.

As shown by FIG. 4, the pressure of fluid in the borehole represented will force the elastomer seal member 21 axially upward toward the upper or inner side of seal gland 24. The elastomer seal member 21 will be forced against the inner side of the seal gland 24. This will force the wedge surface 27 tighter against the bearing pin 18 and prevent the introduction of fluid and materials in the borehole into the lubricant area 22.

The structural details of a drill string unit 10 constructed in accordance with the present invention having been described, the operation of the reamer-stabilizer 10 will now be considered with reference to the Figures of the drawings and to an oil or gas drilling operation wherein a drilling fluid is circulated through the drill string. The reamer-stabilizer 10 is connected as an intermediate element of a rotary drill string. The rotary drill string is lowered into a well bore. A wide variety of drilling environmental conditions affect the performance of the reamer-stabilizer. For example, the temperature will rise as the well bore penetrates deeper into the earth and temperatures in the range of 200° F. to 350° F. at 10,000 foot depth may be expected with even higher temperatures at greater depths. Periodic pressure variations are produced during the drilling operation and these pressure variations can damage the structural elements of the lubrication system.

The present invention allows the pressure inside the lubricant area 22 to be equalized with the pressure outside the reamer-stabilizer 10. The seal assembly 20 is a safeguard against an overfill or excessive pressure condition within lubricated area 22. Should the pressure inside the bearing increase, it will overcome the restriction provided by the wedge surface 27 of seal assembly 20 and the excessive air of lubricant will be vented out of the lubricant area 22 past the seal assembly 20. The pressure of fluid in the borehole moves the elastomer seal member 21 into tighter sealing relationship with the bearing pin 18.

The embodiments of the invention in which an exclusive property or privilege is claimed are defined as follows:

1. An improved seal assembly for a drilling tool operated as an element of a rotary drill string in a fluid drilling environment and having a main body portion including a bearing shaft member, a roller cutter member rotatably mounted on said shaft member, said members cooperating to define therebetween an annular space for a lubricant reservoir and, one of said members having an annular groove for receipt therein of seal means for sealing said reservoir from said drilling fluid and wherein said improved seal assembly is disposed therein and comprises:

a first resilient annular ring seated in said groove and defining axially opposed sidewalls sealingly engaging the sidewalls of said groove and a wedge-shaped sealing surface facing said other member and terminating in an annular apex in sealing engagement with said other member, thereby defining a first angled surface facing said reservoir and a second angled surface facing said drilling fluid environment and wherein, said first annular ring defines an annular channel therein open on said sidewall adjacent said second angled surface and, a second resilient annular ring disposed within said channel, said ring being of a resilient material less resistant to flexure than said first ring whereby external pressure on said second angled face tends to force said apex into tighter sealing engagement with said other member and excessive internal pressure on said first angled face forces said apex to withdraw from said sealed engagement by compressing said second annular ring to relieve said internal pressure from said reservoir.

2. The improved seal assembly of claim 1 wherein said first angled face has a greater surface area than said second angled face.

3. The improved seal assembly according to claim 2 wherein said channel extends axially into said first annular ring from said one sidewall adjacent said second angled surface to beyond the axial position of said sealing apex.

4. The improved seal assembly according to claim 2 wherein said groove is in said roller cutter member and said apex is in sealing engagement with said shaft member.

* * * * *